United States Patent [19]
Laughlin et al.

[11] Patent Number: 6,013,179
[45] Date of Patent: Jan. 11, 2000

[54] FILTER HAVING AN INTEGRAL GASKET

[75] Inventors: John Alton Laughlin; Joseph Stephen Williamson, both of Paris, Tenn.; Brian Thomas Lee, Charlotte, N.C.

[73] Assignee: Dana Corporation, Toledo, Ohio

[21] Appl. No.: 09/001,275

[22] Filed: Dec. 31, 1997

[51] Int. Cl.[7] ................................................. B01D 35/02
[52] U.S. Cl. ...................... 210/172; 210/416.5; 210/445; 210/450; 210/456; 210/493.3; 210/495
[58] Field of Search .................................... 210/167, 168, 210/171, 172, 416.5, 445, 450, 456, 459, 460, 462, 493.3; 277/918; 184/6.24, 106; 123/196 A

[56] References Cited

U.S. PATENT DOCUMENTS

| | | |
|---|---|---|
| 1,230,470 | 6/1917 | Farmer . |
| 2,577,188 | 12/1951 | Hall ......................................... 184/106 |
| 3,168,468 | 2/1965 | Jagdmann ................................ 210/168 |
| 4,136,011 | 1/1979 | Joseph et al. ............................ 210/168 |
| 4,394,853 | 7/1983 | Lopez-Crevillen ..................... 184/106 |
| 4,615,314 | 10/1986 | Baugh ..................................... 184/106 |
| 5,750,021 | 5/1998 | Liang ..................................... 210/493.3 |

*Primary Examiner*—Matthew O. Savage
*Attorney, Agent, or Firm*—Rader, Fishman & Grauer PLLC

[57] ABSTRACT

A filter assembly is disclosed which includes a downwardly sloping skirt portion, a gasket, filter media, and a supply suction tube. The gasket is integral with a top section of the skirt portion. The filter media, which may be pleated for increased filtering capabilities, is positioned at the bottom of the skirt portion such that unfiltered fluid will be gravity biased to pass through the filter media. The suction tube is integral with the skirt and has a first end and a second end. The first end is adapted to be connected to a pump, while the second end extends through the skirt such that the filtered fluid can be drawn through the suction tube when the pump is activated.

15 Claims, 2 Drawing Sheets

FILTER HAVING AN INTEGRAL GASKET

FIELD OF THE INVENTION

The present invention relates generally to filters. More particularly, the invention relates to a filter for a vehicle which has an integral gasket to form a seal between the vehicle body and a fluid pan.

BACKGROUND OF THE INVENTION

Filters are often used for filtering out debris and other foreign matter from fluid. In an engine, oil and transmission filters are typically used for filtering fluid that is contained in a fluid pan, i.e., a sump, wherein the fluid is transported back into the engine by means of a fluid pump. Conventional filter assemblies include a filter, a fluid pan, a suction tube, and a separate gasket that serves to seal the fluid pan to the engine body. The filter is typically provided as a screen, and it is positioned at an exit point of the sump, such that the fluid is drawn through the screen by the suction tube via the pump when it is transported back to the engine. This arrangement is disadvantageous because the pump must generate enough suction to draw the dirty fluid through the screen. Further, by requiring a separate gasket and suction tube, there are more components to assemble, thus increasing assembly time and manufacturing costs.

To address some of these concerns, some filter assemblies use a Dacron® cloth as a filter element. The cloth may also include a rubber compound or heavy resin disposed on the margin so as to serve as a gasket. In use, the cloth is positioned between the intake side of the pump and the body of the fluid pan, such that it is stretched over the top of the fluid pan. Bosses are provided in the fluid pan to serve as supports for the cloth. The fluid pan is further provided with an outlet such that the filtered fluid may be drawn directly out of the sump. However, this type of filter assembly is undesirable because for filtered fluid to be drawn from the sump, a special fluid pan must be provided, thereby increasing costs for the engine. Further, because the cloth is stretched over the entire top surface of the fluid pan, a rather large piece of Dacrong cloth must be provided, thereby raising filter costs.

SUMMARY OF THE INVENTION

The present invention is directed to a filter assembly for use with an fluid pan, such as an oil pan or transmission pan, and vehicle body. The filter assembly includes a skirt portion, a gasket, at least one layer of filter media, and a supply suction tube. The skirt portion has a top section, an intermediate section and a bottom section. The top section is substantially planar and may include a plurality of bolt holes for bolting the filter assembly to the engine body and fluid pan. The bottom section is generally smaller than the top section and has at least one aperture extending across the bottom section. Preferably, the aperture extends across the bottom section in its entirety such that there is essentially no bottom surface of the skirt. The intermediate section is disposed between the top section and the bottom section. It has sides that surround the top section, all the of the sides being sloped downward towards the bottom section such that the skirt is dish-shaped.

The gasket is preferably integral with the top section of the skirt such that the filter assembly may serve as a seal between the engine body and the fluid pan. By incorporating the gasket into the skirt, both manufacturing and assembly costs are reduced. Further, tolerances may be more precisely controlled.

Disposed across the aperture and integrally molded to the bottom section of the skirt is the filter media. The filter media is preferably pleated so as to form serrating channels which serve to evenly distribute the fluid to be filtered. By having the filter media positioned at the bottom section of the skirt, the downwardly sloping intermediate section serves to bias the fluid to pass through the filter media. Further, by molding the filter media directly to the skirt, it is insured that no unfiltered fluid will be deposited into the fluid pan.

The supply suction tube has a first end and a second end. The first end is adapted to be connected to a pump. The second end extends through the skirt and into a sump formed by the fluid pan. In the preferred embodiment, the tube is integral with the skirt such that no additional sealing elements are needed where the tube extends through the skirt. When the pump is activated, filtered fluid is drawn up through the supply tube and transported back to the vehicle. Because the tube extends through the skirt portion, the fluid is drawn directly from the sump, rather than through filter media, such that less suction is required from the pump. Further, the filter of the present invention does not require any modifications to be made to the fluid pan, therefore it can be used with new or existing fluid pans.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
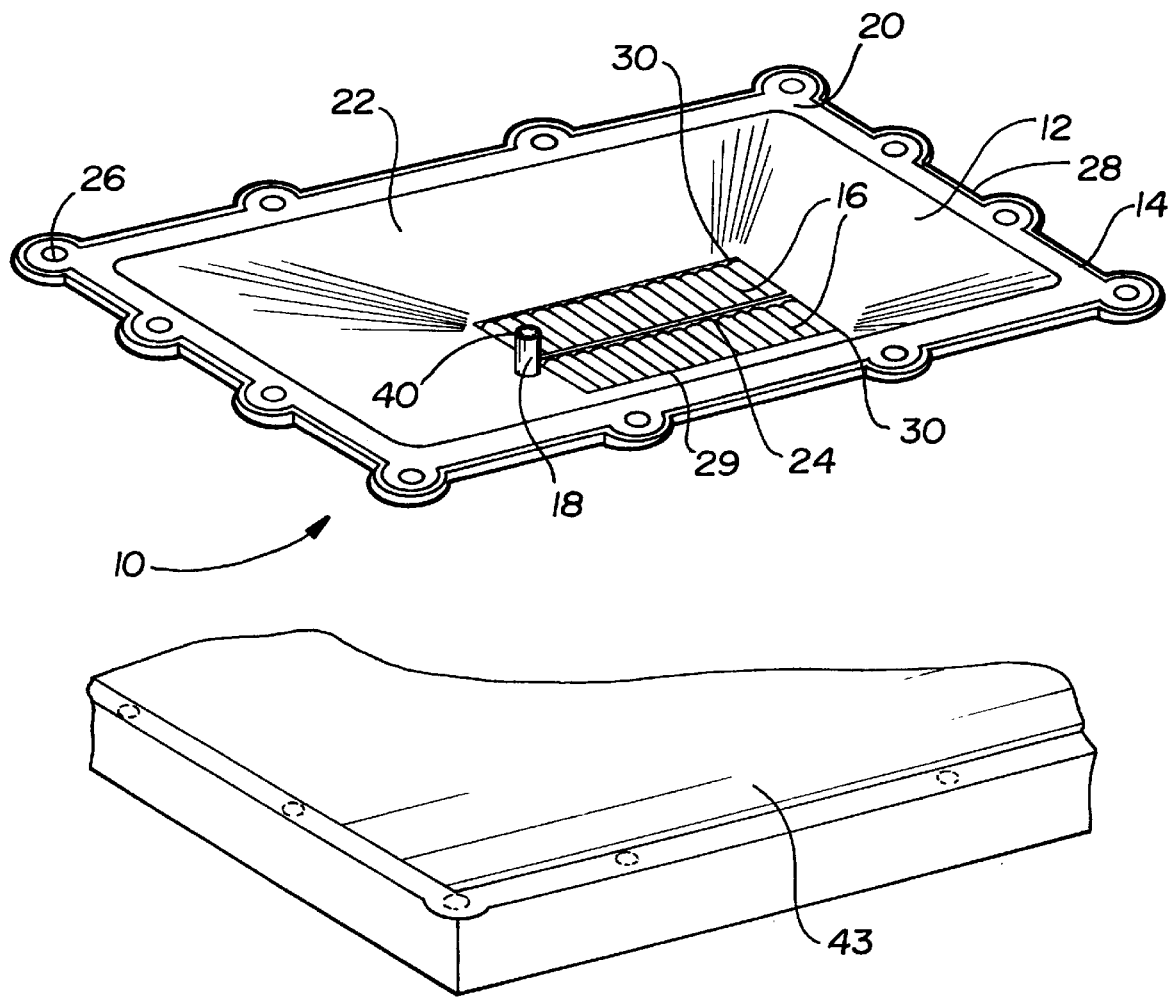
FIG. 1 is a top isometric view of a filter in accordance with the present invention.
Figure 2:
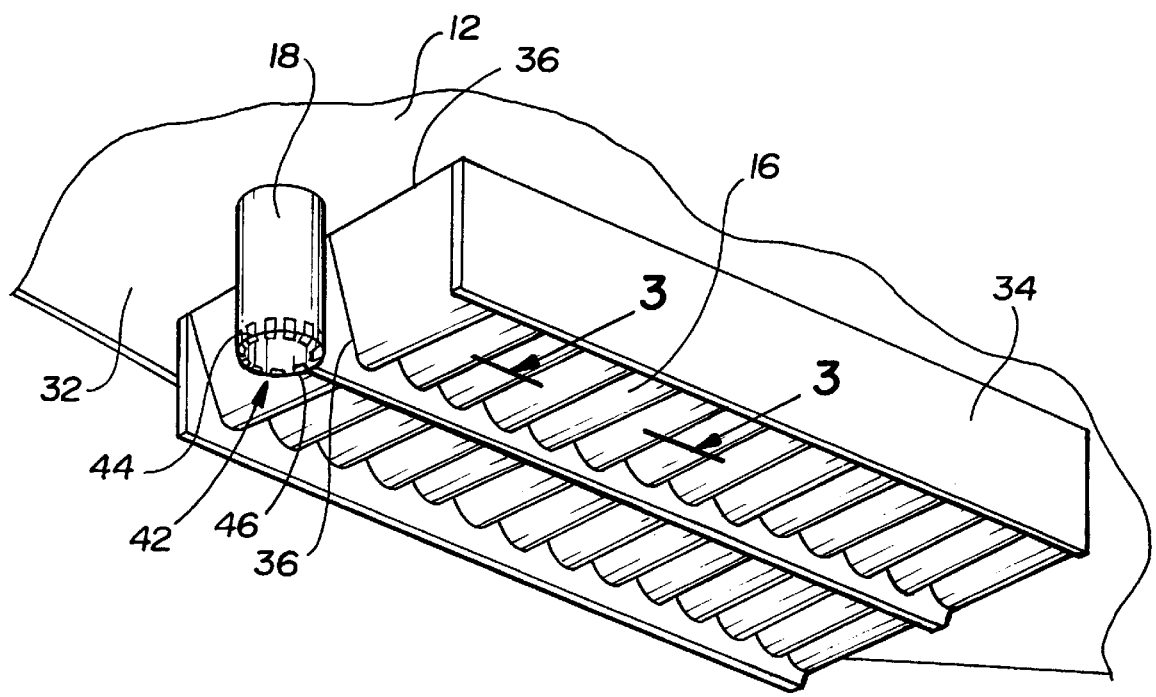
FIG. 2 is a bottom isometric view of the filter.
Figure 3:
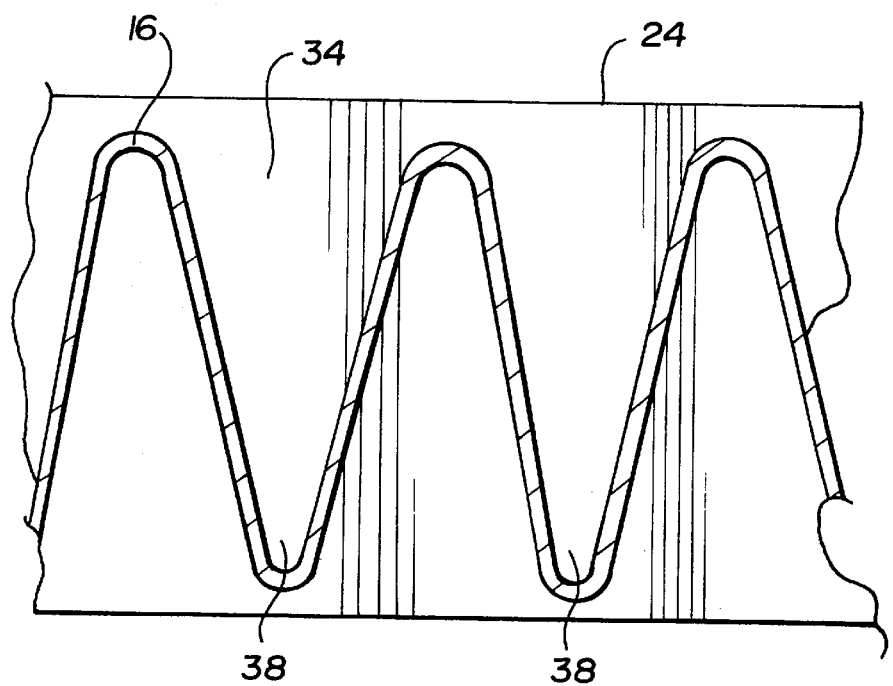
FIG. 3 is an enlarged cross-section view taken along line 3—3 in FIG. 2.

Referring to FIGS. 1–3, a filter assembly 10 for use with a fluid pan and vehicle body includes a skirt 12, a gasket 14, filter media 16, and a supply suction tube 18. Skirt 12 has a top section 20, an intermediate section 22, and a bottom section 24. Top section 20 is substantially planar and may include a plurality of bolt holes 26 such that filter assembly 10 may be easily connected to the fluid pan and vehicle body. In accordance with one aspect of the invention, gasket 14 is disposed along a peripheral edge 28 of top section 20 and is integral with filter assembly 10. Gasket 14 may be edge-bonded, molded into a channel formed in top section 20, or adhered to top section by any other suitable means. Skirt 12 is preferably constructed of plastic or any other suitable material such that filter assembly 10 is lightweight and cost-efficient to manufacture. Further, top section 20 is shaped to be generally the shape of the fluid pan, such that filter assembly 10 is easily connectable thereto.

Intermediate section 22 is disposed between top section 20 and bottom section 24. It has sides that extend about top section 20 inwardly of peripheral edge 28 and gasket 14. Bottom section 24, which is generally smaller than top section 20, has an outer peripheral edge 29 that is spaced laterally inwardly of peripheral edge 28. Preferably, the sides of intermediate section 22 are sloped downward from upper section 20 toward bottom section 24 such that skirt 12 is substantially dish-shaped. However, it is understood that intermediate section 22 may be formed with contoured surfaces, such that filter assembly 10 easily receives components extending from the vehicle body.

Bottom section 24 includes at least one aperture 30 which is covered by filter media 16. Intermediate section 22 cooperates with aperture 30 in bottom section 24 such that oil, or other unfiltered fluid, is biased downward such that the fluid must pass through filter media 16. Preferably, aperture 30 extends across bottom section 24 in its entirety such that there are no low spots in which unfiltered fluid can collect. Further included on an outside surface 32 of intermediate section 22, adjacent to bottom section 24, are optional, downwardly extending lateral walls 34, to be discussed later in greater detail.

As best shown in FIG. 2, filter media 16 may be constructed of a synthetic fiber media, cellulose material, or any other suitable material. Preferably, edges 36 of filter media 16 are molded directly into aperture 30 such that a seal is formed around filter media 16 thereby prohibiting unfiltered oil from passing through. Further, in the preferred embodiment, filter media 16 is pleated, either for surface or depth filtration, and is arranged such that serrating flow channels 38 are formed, shown best in FIG. 3, thereby allowing for more filter media 16 than found in a conventional flat sheet. Therefore, the available surface area of filtering is maximized, prolonging filter life. Flow channels 38 also serve to evenly distribute the unfiltered fluid across filter media 16. Lateral walls 34 are provided to retain pleated filter media 16, as well as guide the direction of flow for the filtered fluid.

Filter assembly 10 further includes a supply suction tube 18. Tube 18 is preferably integral with skirt 12, thereby reducing the number of components of filter assembly 10, assembly time, and improving assembly tolerances. FIGS. 1 and 2 show tube 18 integral with intermediate section 22, however, it is understood that tube may be positioned at any location on skirt 12, or through filter media 16. Tube 18 has a first end 40 and a second end 42. First end 40 extends in an upward direction from skirt 12 and is adapted to connect to a suction pump (not shown) by any suitable fastener. Second end extends through skirt 12. In the preferred embodiment, tube 18 is positioned at a lower portion of intermediate section 22, adjacent to filter media 16 such that filtered fluid is easily drawn into tube 18 when the pump is activated.

In use, filter assembly 10 is positioned over a fluid pan 43, with top section being 20 connected to the fluid pan in mating engagement. The fluid pan defines a sump beneath filter assembly 10. The fluid pan and filter assembly 10 are then connected to a vehicle body (not shown), with top section 20 of filter assembly 10 serving as a seal between the vehicle body and fluid pan, due to integral gasket 14. By having gasket 14 integral with top section 20, there is no need to provide a separate gasket that would require additional assembly time to insure proper positioning of the gasket.

Once filter assembly 10 and the fluid pan are connected to the vehicle body, dirty fluid from the vehicle drips onto skirt 12 where intermediate section 22 biases the fluid to pass through filter media 16. Filter media 16 filters out debris and other foreign matter from the fluid and directs the filtered fluid into the sump formed by the fluid pan. First end 40 of tube 18 is connected to a pump, while second end 42 is positioned in the sump, such that filtered fluid may be drawn up through tube 18 and directed back to the engine body. Preferably, tang members 44 are provided on the periphery of second end 42 such that if second end 42 rests on a surface of the fluid pan, the filtered fluid may still pass through channels 46 positioned between adjacent tang members 44, thereby preventing tube 18 from becoming sealed off.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A filter assembly, comprising:

a skirt portion having a top section, an intermediate section, and bottom section, said skirt portion adapted to be mounted above a fluid sump;

said intermediate section being disposed between said top section and said bottom section and having sides that surround said top section, some of said sides being sloped downward towards said bottom section;

said bottom section further including at least one aperture therethrough;

at least one layer of filter media disposed over said aperture;

at least one supply suction tube having a first end and a second end, said supply suction tube extending through said skirt portion with said second end being disposed outside of said skirt; and wherein said bottom section excludes integral downwardly extending peripheral walls surrounding said at least one aperture and said at least one supply suction tube, such that said bottom section does not define said fluid sump.

2. The filter assembly of claim 1, further including a gasket integral with said top section of said skirt portion.

3. The filter assembly of claim 1, wherein said supply suction tube is integral with said intermediate section of said skirt.

4. The filter assembly of claim 1, wherein said first end of said supply suction tube is adapted to be connected to a fluid pump so as to pump filtered fluid from beneath an outside surface of said intermediate section of said skirt.

5. The filter assembly of claim 1, wherein said second end of said supply suction tube further includes a plurality of spaced apart tang members disposed thereon, a channel defined between each pair of adjacent tang members.

6. The filter assembly of claim 1, wherein said aperture extends across said bottom section in its entirety.

7. The filter assembly of claim 1, wherein said filter media is integrally molded into said bottom section of said skirt.

8. The filter assembly of claim 1, wherein said filter media has a plurality of pleats.

9. The filter assembly of claim 8, wherein said pleats are adapted to provide at least one row of serrating flow channels to evenly distribute the fluid across said filter media.

10. A filter assembly, comprising:

a skirt portion having a top section, an intermediate section, and bottom section, said skirt portion adapted to be mounted above a fluid sump;

said intermediate section being disposed between said section and said bottom section and having sides that surround said top section, all of said sides being sloped downward towards said bottom section;

said bottom section further including at least one aperture therethrough;

a gasket integral with said top section of said skirt portion;

at least one layer of pleated filter media disposed over said aperture;

at least one supply suction tube having a first end and a second end, said supply suction tube integral with said skirt portion and having said second end disposed outside of said skirt; and wherein said bottom section excludes integral downwardly extending peripheral walls surrounding said at least one aperture and said at least one supply suction tube, such that said bottom section does not define said fluid sump.

11. The filter assembly of claim 10, wherein said first end of said supply suction tube is adapted to be connected to a fluid pump so as to pump filtered fluid from beneath an outside surface of said intermediate section of said skirt.

12. The filter assembly of claim 10, wherein said second end of said supply suction tube further includes a plurality of spaced apart tang members disposed thereon.

13. The filter assembly of claim 10, wherein said aperture extends across said bottom section in its entirety.

14. The filter assembly of claim 10, wherein said pleats are adapted to provide at least one row of serrating flow channels to evenly distribute the fluid across said filter media.

15. A combination of a filter assembly, a fluid pan and vehicle body, the combination comprising:

a skirt portion having an outside surface, a top section, an intermediate section, and bottom section, said skirt portion adapted to be mounted above a fluid sump;

wherein said top section is adapted to be connected to a said vehicle body such that said filter assembly is positioned below said vehicle body; said intermediate section having sides that are all sloped downward towards said bottom section, said bottom section further including at least one aperture extending substantially across the entire of said bottom section for fluid to pass through;

said fluid pan positioned below said filter assembly such that said filter assembly is sandwiched between said vehicle body and said fluid pan, said fluid pan further forming said fluid sump when fluid passes through said filter assembly and is collected in said fluid pan;

a gasket integral with said top section of said skirt portion such that said filter assembly serves to seal said fluid pan to said vehicle body when said filter assembly and fluid pan are connected to said vehicle body;

at least one pleated layer of filter media disposed across said aperture at said bottom section of said skirt portion, said pleated filter media providing serrating flow channels to evenly distribute the fluid across said filter media as the fluid flows through said aperture and into said fluid pan; and a supply suction tube integral with said skirt portion, said supply suction tube having a first end and a second end, said first end adapted to be connected to a pump; said second end extending through said skirt into the sump such that when said pump is activated, filtered fluid is directed up through said supply suction tube and is directed back to said vehicle body;

wherein said bottom section excludes integral downwardly extending peripheral walls surrounding said at least one aperture and said supply suction tube, such that said bottom section does not define said fluid sump.

* * * * *